United States Patent
Stautner et al.

(10) Patent No.: US 9,570,220 B2
(45) Date of Patent: Feb. 14, 2017

(54) REMOTE ACTUATED CRYOCOOLER FOR SUPERCONDUCTING GENERATOR AND METHOD OF ASSEMBLING THE SAME

(71) Applicant: General Electric Company, Schenectady, NY (US)

(72) Inventors: Ernst Wolfgang Stautner, Niskayuna, NY (US); Kiruba Sivasubramaniam Haran, Clifton Park, NY (US); Ruben Jeevanasan Fair, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 515 days.

(21) Appl. No.: 13/646,914

(22) Filed: Oct. 8, 2012

(65) Prior Publication Data

US 2014/0100113 A1   Apr. 10, 2014

(51) Int. Cl.
*H01F 6/04* (2006.01)
*F25B 19/00* (2006.01)
*H02K 55/04* (2006.01)
*F25B 9/14* (2006.01)
*H02K 7/18* (2006.01)

(52) U.S. Cl.
CPC ............. *H01F 6/04* (2013.01); *F25B 9/145* (2013.01); *F25B 19/00* (2013.01); *H02K 55/04* (2013.01); *F25B 9/14* (2013.01); *H02K 7/183* (2013.01); *Y02E 40/625* (2013.01); *Y10T 29/49359* (2015.01)

(58) Field of Classification Search
CPC .................................................. F25D 19/006
USPC ............................................ 62/6, 51.1, 383
See application file for complete search history.

(56) References Cited

U.S. PATENT DOCUMENTS

| 3,769,770 A | 11/1973 | Deschamps et al. |
| 4,544,979 A | 10/1985 | Ennis, Jr. et al. |
| 4,926,647 A * | 5/1990 | Dorri ................ F25D 3/10 174/15.4 |
| 4,930,318 A | 6/1990 | Brzozowski |
| 4,986,078 A * | 1/1991 | Laskaris ................ 62/51.1 |
| 5,111,665 A | 5/1992 | Ackermann |

(Continued)

FOREIGN PATENT DOCUMENTS

| CN | 101951128 A | 1/2011 |
| JP | 2011244536 A | 12/2011 |

OTHER PUBLICATIONS

Hahn et al., "Transient Shielding Effect of Slitted Electrothermal Shield of Superconducting Generator", IEEE Transactions on Magnetics, vol. 28, Issue 1, pp. 295-298, Jan. 1992.

(Continued)

*Primary Examiner* — Jonathan Bradford
(74) *Attorney, Agent, or Firm* — John P. Darling (57) ABSTRACT

In one embodiment, a cryocooler assembly for cooling a heat load is provided. The cryocooler assembly includes a vacuum vessel surrounding the heat load and a cryocooler at least partially inserted into the vacuum vessel, the cryocooler including a coldhead. The assembly further includes an actuator coupled to the cryocooler. The actuator is configured to translate the cryocooler coldhead into thermal engagement with the heat load and to maintain constant pressure of the coldhead against the heat load to facilitate maintaining thermal engagement with the heat load as the heat load shrinks during a cool down process.

11 Claims, 6 Drawing Sheets

(56) References Cited

U.S. PATENT DOCUMENTS

| | | | |
|---|---|---|---|
| 5,129,232 A | | 7/1992 | Minas et al. |
| 5,430,423 A | * | 7/1995 | Herd et al. .................... 335/216 |
| 5,463,872 A | * | 11/1995 | Vader .................... H01L 23/445 |
| | | | 165/80.4 |
| 5,563,566 A | * | 10/1996 | Laskaris ............ G01R 33/3806 |
| | | | 324/318 |
| 5,635,888 A | | 6/1997 | Good |
| 5,647,228 A | * | 7/1997 | Sager ........................ B01L 7/00 |
| | | | 62/49.2 |
| 5,880,547 A | | 3/1999 | Shoykhet |
| 6,129,477 A | | 10/2000 | Shoykhet |
| 6,173,577 B1 | * | 1/2001 | Gold .................... H01L 23/445 |
| | | | 257/E23.096 |
| 6,590,308 B2 | | 7/2003 | Dawson et al. |
| 6,605,339 B1 | | 8/2003 | Marshall et al. |
| 6,605,885 B2 | | 8/2003 | Laskaris et al. |
| 6,762,517 B2 | | 7/2004 | Wang et al. |
| 6,803,684 B2 | | 10/2004 | Wang et al. |
| 7,548,008 B2 | | 6/2009 | Jansen et al. |
| 7,567,418 B2 | | 7/2009 | Halsey |
| 7,741,738 B2 | | 6/2010 | Ries |
| 7,821,164 B2 | | 10/2010 | Laskaris et al. |
| 2002/0145355 A1 | | 10/2002 | Maguire et al. |
| 2004/0046474 A1 | | 3/2004 | Kalsi |
| 2005/0252219 A1 | * | 11/2005 | Van Hasselt .............. H01F 6/04 |
| | | | 62/6 |
| 2006/0082249 A1 | | 4/2006 | Frank et al. |
| 2006/0086098 A1 | * | 4/2006 | Kirkconnell et al. .............. 62/6 |
| 2008/0067881 A1 | | 3/2008 | Winn |
| 2008/0104968 A1 | * | 5/2008 | Radovinsky et al. .............. 62/6 |
| 2008/0197633 A1 | | 8/2008 | Laskaris et al. |
| 2009/0272127 A1 | * | 11/2009 | Radovinsky et al. ......... 62/50.7 |
| 2011/0031760 A1 | | 2/2011 | Lugg |
| 2011/0133871 A1 | | 6/2011 | Stautner et al. |
| 2012/0049531 A1 | | 3/2012 | Bray |
| 2014/0311166 A1 | * | 10/2014 | Buelow et al. .................... 62/6 |

OTHER PUBLICATIONS

Saho et al.,"A New Technique for the Analysis of Torque Tube Heat Exchangers of Superconducting Generators", Cryogenics, vol. 36, Issue 5, pp. 343-349, 1996.

\* cited by examiner

REMOTE ACTUATED CRYOCOOLER FOR SUPERCONDUCTING GENERATOR AND METHOD OF ASSEMBLING THE SAME

STATEMENT REGARDING FEDERALLY SPONSORED RESEARCH & DEVELOPMENT

This disclosure was made with Government support under contract number DE-EE0005143 awarded by the Department of Energy (DOE). The Government has certain rights in the disclosure.

BACKGROUND OF THE DISCLOSURE

The field of the disclosure relates generally to cooling assemblies and, more particularly, to cryocooler assemblies.

Known cryocoolers can achieve low temperatures at their coldheads for removing heat from an electrical machine such as a superconducting generator. Typically, the coldheads in a two stage cryocooler are located at the end of the first and second stage portions of the cryocooler. In some known applications, the cryocooler coldheads are connected to surfaces, such as radiation shields, from which heat is to be removed. During a cool down process, the cryocooler coldheads may eventually become a source of heat and the heads may be manually detached from the cooled surfaces by an operator to further facilitate cooling operations. However, manual movements of cryocoolers located in remote locations, for example in a wind turbine nacelle, are costly, time consuming and inconvenient.

BRIEF DESCRIPTION

In one embodiment, a cryocooler assembly for cooling a heat load is provided. The cryocooler assembly includes a vacuum vessel surrounding the heat load and a cryocooler at least partially inserted into the vacuum vessel, the cryocooler including a coldhead. The assembly further includes an actuator coupled to the cryocooler. The actuator is configured to translate the cryocooler coldhead into thermal engagement with the heat load and to maintain constant pressure of the coldhead against the heat load to facilitate maintaining thermal engagement with the heat load as the heat load shrinks during a cool down process.

In another embodiment, a cooling assembly for a superconducting generator is provided. The assembly includes a superconducting field winding coil former comprising a hub end and an opposing non-hub end, and at least one cryocooler positioned proximate the superconducting field winding coil former, the cryocooler including a coldhead. The assembly further includes an actuator coupled to the cryocooler. The actuator is configured to translate the coldhead into thermal engagement with the superconducting field winding coil former and to maintain constant pressure of the coldhead against the superconducting field winding coil former to facilitate maintaining thermal engagement with the superconducting field winding coil former as the superconducting field winding coil former shrinks during a cool down process.

In yet another embodiment, a method of assembling a cooling assembly for a superconducting generator is provided. The method includes positioning a vacuum vessel proximate the superconducting generator and positioning a superconducting field winding coil former within the vacuum vessel, the superconducting field winding coil former including a hub end and an opposing non-hub end. The method further includes positioning at least one cryocooler at least partially within the vacuum vessel, the cryocooler including a coldhead, and operatively coupling an actuator to the cryocooler. The actuator is configured to translate the coldhead into thermal engagement with the superconducting field winding coil former and to maintain constant pressure of the coldhead against the superconducting field winding coil former to facilitate maintaining thermal engagement with the superconducting field winding coil former as the superconducting field winding coil former shrinks during a cool down process.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The embodiments described herein relate to electrical machines and methods of cooling the electrical machines. More particularly, the embodiments relate to a flow assembly that is configured to facilitate cooling the electrical machine. It should be understood that the embodiments described herein for electrical machines are not limited to generators, and should be further understood that the descriptions and figures that utilize a generator and a wind turbine are exemplary only.

The embodiments described herein relate to a superconducting generator having a stationary, or non-rotating, field winding and a rotating armature driven directly by a turbine, such as a wind turbine. The superconducting generator may be mounted in the upper region of a wind turbine tower and coupled directly to the rotating component of the wind turbine, e.g., the blades.

The superconducting generator provides high torque density, which allows the generator to be lightweight, despite the added components needed to cool and insulate the superconducting coils in the field winding. The stationary field winding includes a series of racetrack shaped superconducting coils cooled to cryogenic temperatures. The rotating armature is coupled directly to and turned by the wind turbine. A collector assembly transfers the current generated by the rotating armature to conductors that, in one embodiment, extend down through the frame of the wind turbine.

Figure 1:
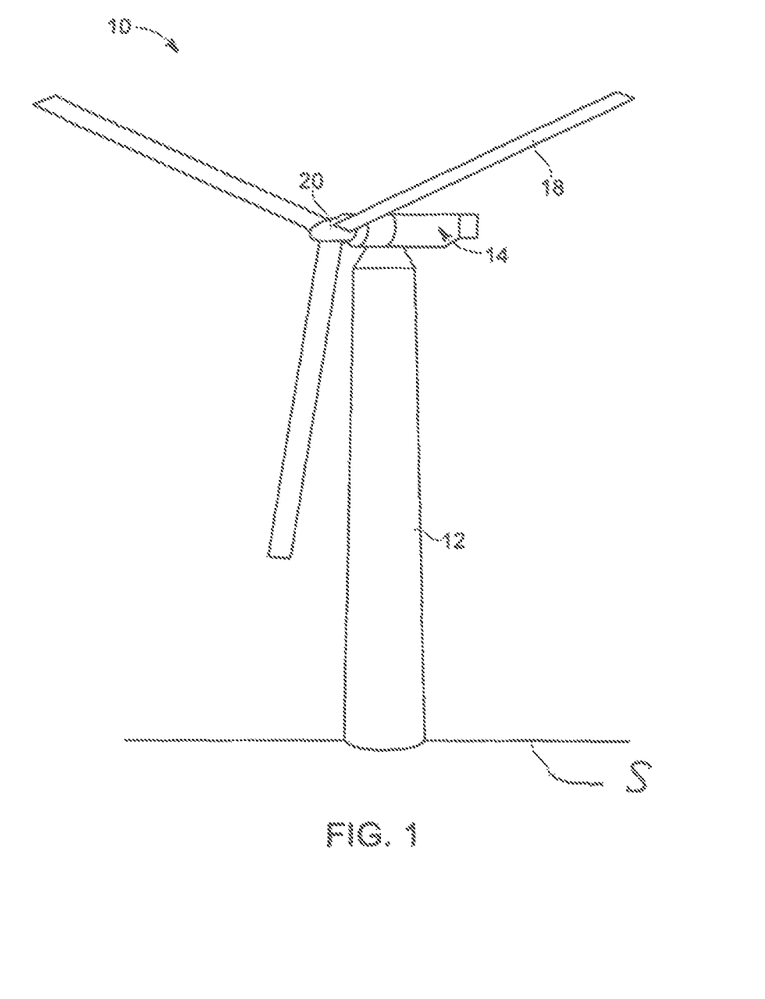
FIG. 1 is a perspective view of an exemplary wind turbine.

FIG. 1 is a perspective view of a wind turbine 10 that includes a tower 12 anchored to a support S such as, for example, a ground, a floating platform and a sea-bed. A superconducting generator 22 (shown in FIGS. 2 and 3) is housed within a nacelle 14 mounted on top of tower 12. Nacelle 14 is coupled to tower 12 to turn turbine blades 18 with respect to the direction of the wind. Blades 18 extend radially outward from a hub 20 and typically face into the wind and are turned by the energy of the wind. Superconducting generator 22 is driven directly by hub 20 and blades 18.

In the exemplary embodiment, tower 12 is between about 20 meters and about 100 meters in height, about one meter to about two meters in diameter at the top and about four meters in diameter at the ground base. In the exemplary embodiment, blades 18 are between about 10 meters and about 45 meters in length and are equally spaced about hub 20. Blades 18 may have a fixed pitch or a variable pitch, depending on whether a variable pitch gearbox (not shown) is included in hub 20.

Figure 2:
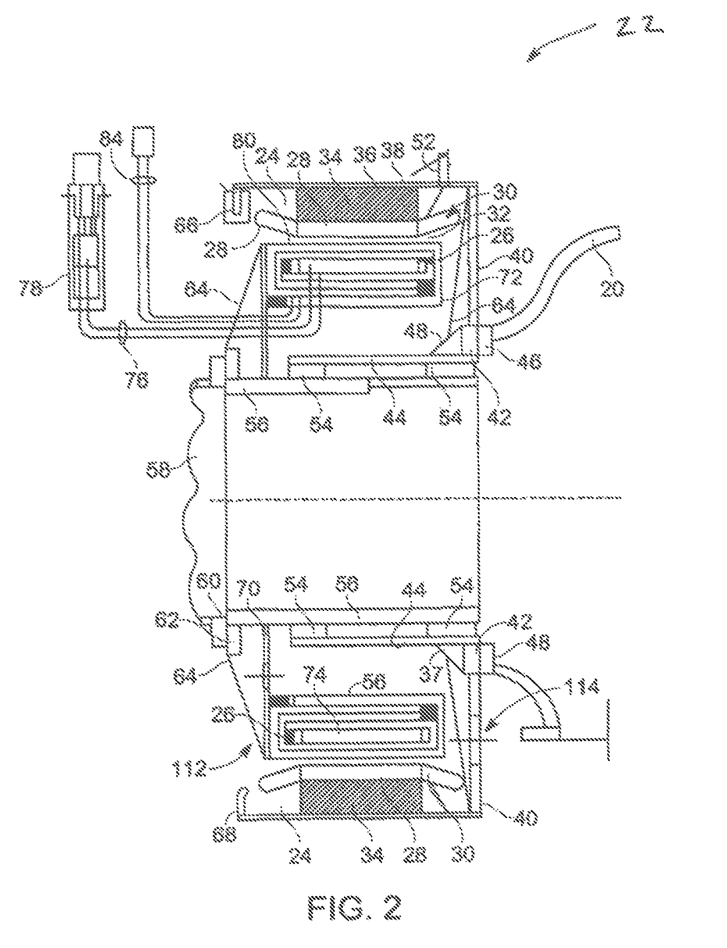
FIG. 2 is a cross-sectional view of a superconducting generator for use in the wind turbine shown in FIG. 1.

FIG. 2 is a cross-sectional view of superconducting generator 22 for use with wind turbine 10 (shown in FIG. 1). Superconducting generator 22 includes an annular rotating armature 24, and a stationary field winding assembly 26 surrounded by rotating armature 24. Rotating armature 24 includes conductive windings 28 (e.g. coils or bars) arranged longitudinally along the length of rotating armature 24 and on an inside cylindrical surface of rotating armature 24. In the exemplary embodiment, conductive windings 28 are connected at their opposite ends to one another by conductive end turns 30. Windings 28 are separated from stationary superconducting field winding assembly 26 by a narrow air gap 32.

In the exemplary embodiment, rotating armature 24 includes a cylindrical yoke 34 that supports windings 28. An outer surface 36 of yoke 34 is coupled to a cylindrical housing 38 that rotates with rotating armature 24. Cylindrical housing 38 is coupled to a circular disc 40 that supports housing 38 and rotating armature 24. Disc 40 includes a circular aperture (not shown) that is mounted to an annular bracket 42 to which is attached an annular base 46 of hub 20. Bracket 42 is coupled to a rotating cylindrical support tube 44 that is positioned radially inward of windings 28. A reinforcing ring 48 is coupled to bracket 42 and support tube 44.

In the exemplary embodiment, a pair of annular bearings 54 rotatably support tube 44 on a stationary base tube 56 attached to a mount 58 that is supported by nacelle 14. A ring bracket 60 attaches mount 58 to a bracket 62 for base tube 56. Gussets 64 extend from disc 40 to support tube 44 and structurally reinforce disc 40. A disc brake 66 grasps an annular lip 68 on an end of housing 38. Brake 66 is configured to slow or stop rotation of blades 18 if the wind becomes excessive, causing blades 18 to rotate too fast.

In the exemplary embodiment, base tube 56 supports a field winding support disc 70 upon which is mounted stationary field winding assembly 26. A vacuum vessel 72, such as a cryostat, is configured to enclose stator field winding assembly 26. More particularly, vacuum vessel 72 is configured to couple to disc 70 and contains superconducting coils 74 of field winding assembly 26. Vacuum vessel 72 is configured to insulate and cool superconducting coils 74 to near absolute zero (e.g. 4 K). To cool coils 74, vacuum vessel 72 includes insulated conduits 76 to receive liquid helium or other similar cryogenic liquid (not shown). A two-stage cryocooler 78 is configured to condense helium vapor, which flows around superconducting coil magnets (not shown) of field winding assembly 26 and cools the coil magnets to achieve a superconducting condition. Moreover, coils 74 are cooled as the liquid helium at least partially vaporizes. The helium vapor flows through conduits 76 to cryocooler 78, where the helium is cooled, liquefied and returned via conduit 76 to field winding assembly 26. Vacuum vessel 72 includes a thermal shield 80 that is cooled by thermal contact with cryocooler 78 and/or an additional cryocooler (not shown). Cooling thermal shield 80 facilitates cooling field winding assembly 26 by at least reducing the thermal radiation heat absorbed by the helium.

Figure 3:
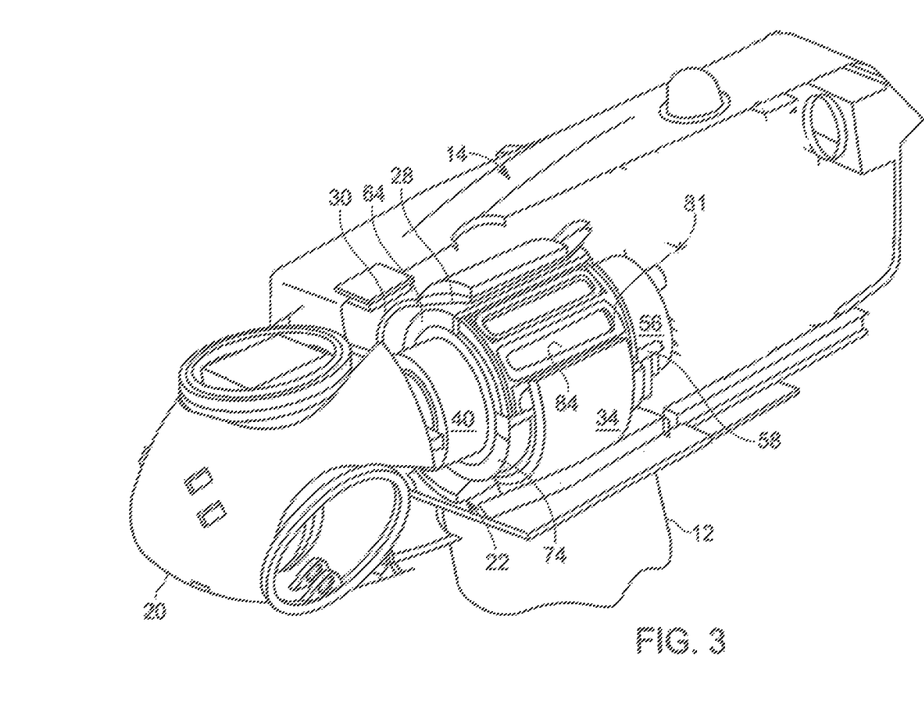
FIG. 3 is a cut-away view of the superconducting generator housed in a nacelle and coupled to a hub of the wind turbine shown in FIG. 1.

FIG. 3 is a cut-away view of superconducting generator 22 housed in nacelle 14 and coupled to hub 20. More particularly, support tube 44 is coupled directly to hub 20 and supports windings 28, 30 and yoke 34. Windings 28 and 30 are coaxial with and rotate about superconducting coil magnets 81, which are enclosed in casing 82 and receive cryogen through cooling passages 84. In the exemplary embodiment, casing 82 is fixed to base tube 56, and mounts support base tube 56 within nacelle 14.

Figure 4:
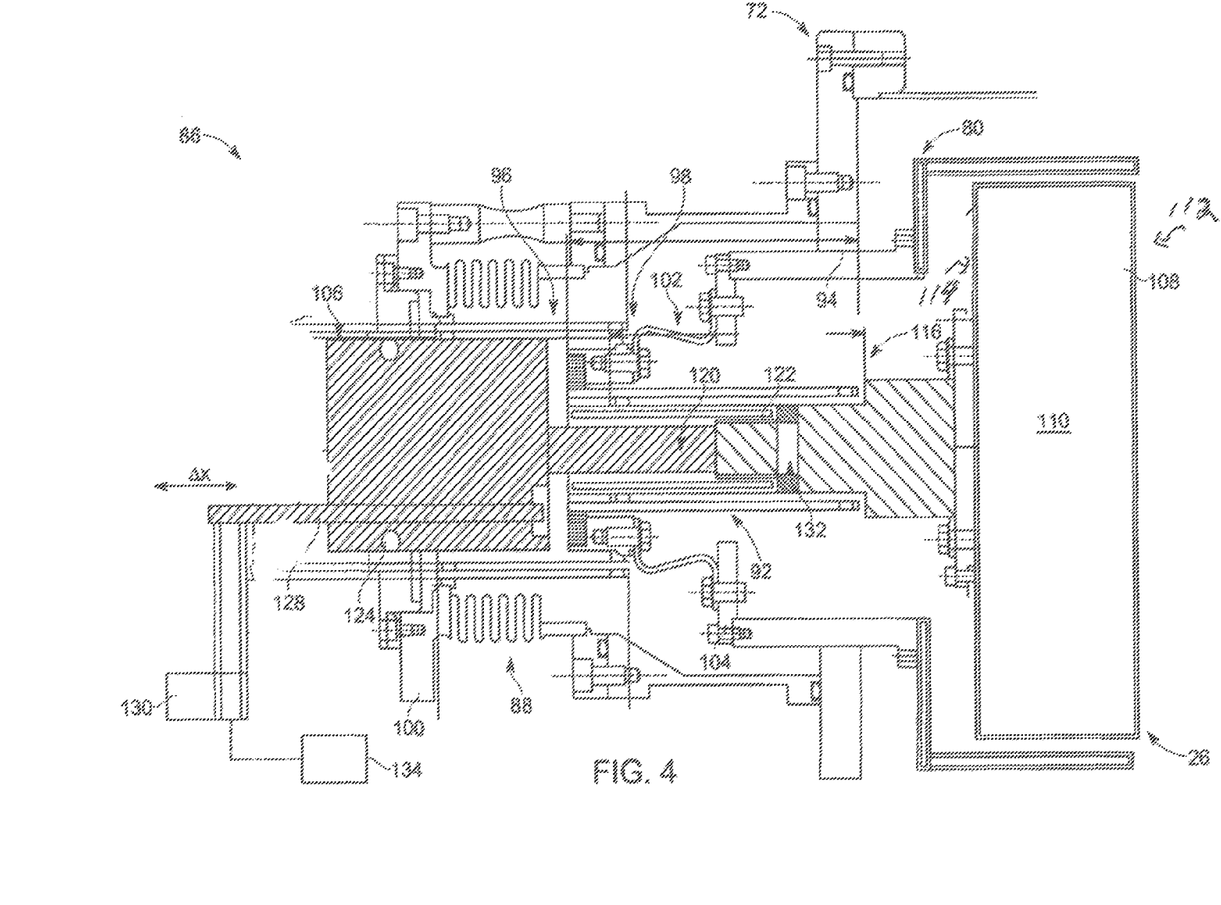
FIG. 4 is a cross-sectional view of an exemplary cryocooler assembly, in a first position, that is configured to cool components of the superconducting generator shown in FIG. 2.
Figure 5:
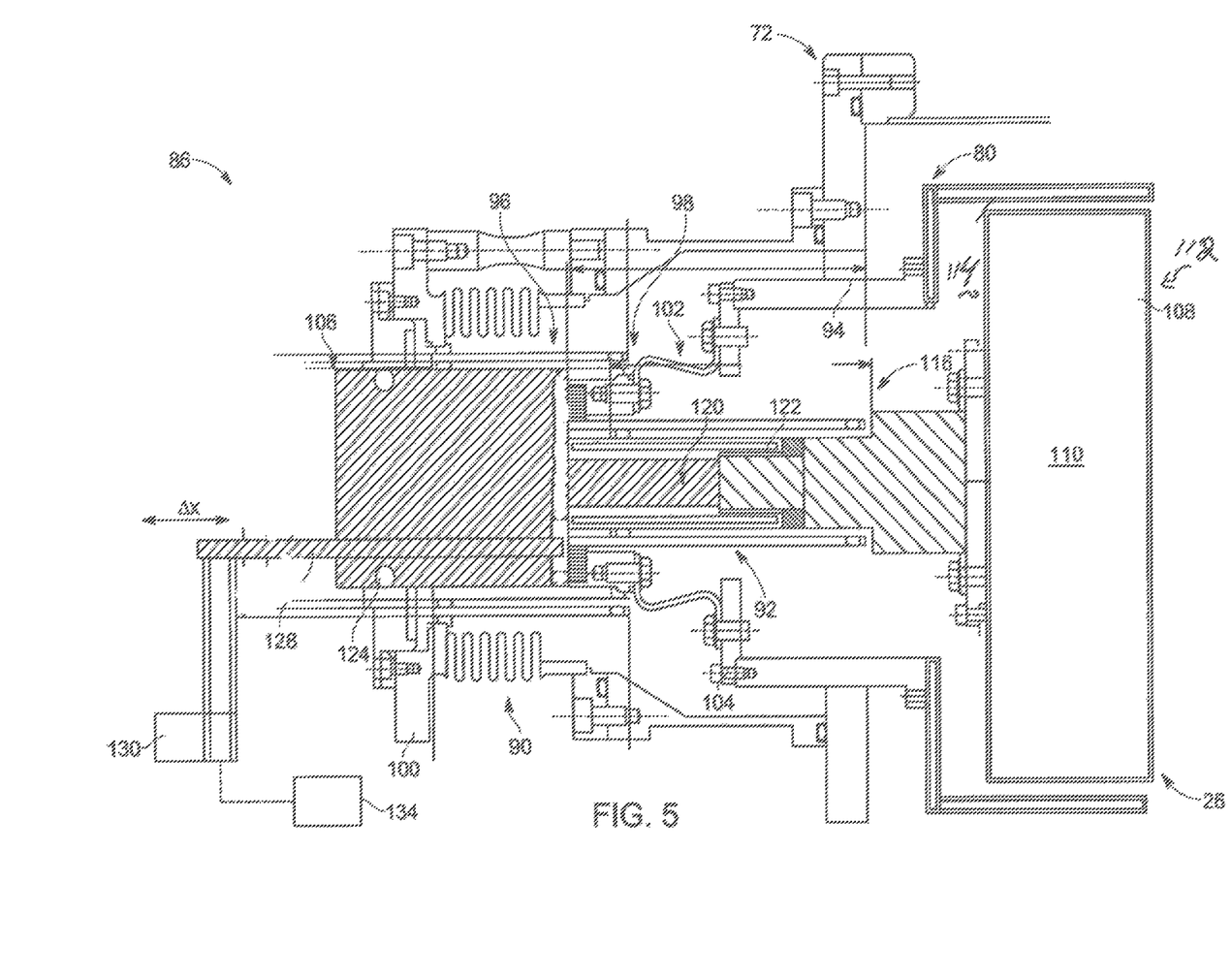
FIG. 5 is a cross-sectional view of the exemplary cryocooler assembly in a second position.

FIG. 4 is a cross-sectional view of a cryocooler assembly 86, in a first position 88, that is configured to cool stationary superconducting field winding assembly 26. FIG. 5 is a cross-sectional view of a cryocooler assembly 86 in a second position 90. Cryocooler assembly 86 includes an inner tube 92 extending through an opening 94 defined through vacuum vessel 72 and thermal shield 80. Inner tube 92 is positioned within an outer tube 96 that is coupled to a heat station 98 and a support plate 100. Thermal shield 80 is thermally coupled to first heat station 98 by a thermal connector or braid 102 and a support plate 104. Cryocooler assembly 86 is configured to provide a vacuum insulated assembly for insertion of a cryocooler 106. In the exemplary embodiment, cryocooler 106 may be a pulse tube, GM or Stirling type cryocooler. Cryocooler 106 can include any type of cooler to enable cryocooler to enable cryocooler assembly 86 to function as described herein.

In the exemplary embodiment, cryocooler 106 is a single stage cool down cooler for cooling a superconducting field winding coil former 108 of field winding assembly 26, wherein field winding coil former 108 is configured to generate a heat load 110. Alternatively, cryocooler 106 can be a two stage cool down cooler (not shown). In the exemplary embodiment, cryocooler 106 is configured to cool coil former 108 from room temperature (e.g., 300 K) to approximately 20 K, at which point the helium precool process of cryocooler 78 (shown in FIG. 2) may commence. Coil former 108 includes a hub end 112 and a non-hub end 114, wherein non-hub end 114 is coupled to an extended or matching contact surface 116 of cryocooler assembly 86.

Cryocooler 106 includes a portion 120 having a coldhead 122 and is inserted at least partially into tubes 92 and 96 of cryocooler assembly 86. A ring seal 124, for example a piston type O-ring seal, is positioned between cryocooler 106 and outer tube 96 to maintain a vacuum seal between cryocooler assembly 86 and the ambient environment 126. Cryocooler 106 includes a guide rod 128 that extends axially through outer tube 96. An actuator 130 is coupled to guide rod 128 to translate guide rod 128 and cryocooler 106 from first position 88 (shown in FIG. 4) to second position 90 (shown in FIG. 5). Although not shown, in the exemplary embodiment, two cryocooler assemblies 86 can be utilized to facilitate performing the cool down process of coil former 108. For example, a cryocooler assembly 86 is located on both sides of coil former 108 such that a cryocooler assembly 86 is proximate each of hub end 112 and non-hub end 114. The combined coldheads 122 of multiple cryocooler assemblies 86 increase cooling capacity and reduce cool down time of coil former 108. Any number of cryocooler assemblies 86 may be used that enables superconducting generator 22 to function as described herein.

In the exemplary embodiment, actuator 130 is configured to translate guide rod 128 and cryocooler 106 axially within outer tube 96 and inner tube 92 to establish selective contact between coldhead 122 and contact surface 116, which is thermally coupled to coil former 108. For example, in first position 88 (shown in FIG. 4), coldhead 122 is distanced from contact surface 116 by a gap 132. Moreover, actuator 130 is configured to translate guide rod 128 toward coil former 108, which translates coldhead 122 across gap 132 and into thermal engagement with contact surface 116 and coil former 108 in second position 90 (shown in FIG. 5). In the exemplary embodiment, actuator 130 is a hydraulic actuator. Alternatively, actuator 130 may be a pneumatic actuator, an electric actuator, a piezoelectric actuator, a moving iron controllable (MIC) actuator and/or a vacuum. However, actuator 130 may be any type of actuator that enables cryocooler assembly 100 to function as described herein.

In the exemplary embodiment, cryocooler 106 is configured to produce a low temperature at coldhead 122, which facilitates cooling down coil former 108 via conduction through contact surface 116. In the exemplary embodiment, coldhead 122 is configured to produce a temperature of approximately 20 K and perform a cool down operation of coil former 108 from about 300 K to about 20 K over several hours to several days depending on the operating power rating design.

During the cool down operation, coil former 108 and/or contact surface 116 shrink due to reduced temperatures. Shrinkage of coil former 108 and/or contact surface 116 may reduce the effectiveness of and/or break the thermal connection between coldhead 122 and contact surface 116. In response to shrinkage of coil former 108 and/or surface 116, actuator 130 is configured to continue translating guide rod 128 and cryocooler 106 toward coil former 108 to facilitate maintaining constant pressure of coldhead 122 against contact surface 116 (or coil former 108 if contact surface 116 is not present). As such, thermal engagement is maintained with contact surface 116 and/or coil former 108 as contact surface 116 and/or coil former 108 shrink during the cool down process. In the exemplary embodiment, actuator 130 is configured to maintain contact pressure between coldhead 122 and contact surface 116 between approximately 100 Newtons and approximately 1000 Newtons. Alternatively, actuator 130 is configured to maintain contact pressure between coldhead 122 and contact surface 116 less than approximately 100 Newtons or more than approximately 1000 Newtons.

In the exemplary embodiment, once coil former 108 reaches a predetermined temperature (e.g., the temperature of coldhead 122), further temperature reduction of coil former 108 is accomplished with the liquid helium cooling process of cryocooler 78 (shown in FIG. 3). However, if coldhead 122 remains thermally coupled to contact surface 116, it may act as a heat load once the liquid helium cools coil former 108 below the temperature of coldhead 122 (e.g., below 20 K). In the exemplary embodiment, once coil former 108 reaches a predetermined temperature (e.g., the approximate temperature of coldhead 122), actuator 130 is configured to translate guide rod 128 and cryocooler 106 axially away from coil former 108 from second position 90 (shown in FIG. 5) to first position 88 (shown in FIG. 4) to decouple the thermal connection between coldhead 122 and contact surface 116 and/or coil former 108 to prevent warming of coil former 108. If coil former 108 requires a further cool down process (e.g., after a shutdown or maintenance), the process is repeated.

In the exemplary embodiment, a controller 134 is communicatively coupled to actuator 130 to control translation of guide rod 128 and cryocooler 106. Due to remote location of many wind turbines 10 and difficult access to superconducting generator 22 located within nacelle 14, controller 134 controls actuator 130 during the cool down process using cryocooler assembly 86. In the exemplary embodiment, a remote operator (not shown) sends a signal (not shown) by any known means to controller 134 to actuate actuator 130 to selectively translate cryocooler coldhead 122 into and out of thermal engagement with contact surface 116 and/or coil former 108. Alternatively, controller 134 monitors superconducting generator 22 and automatically actuates actuator 130 to perform a cool down process of coil former 108 at a predetermined time and automatically thermally decouples coldhead 122 from contact surface 116 and/or coil former 108 at another predetermined time, for example, when coil former 108 substantially reaches the temperature of coldhead 122.

Figure 6:
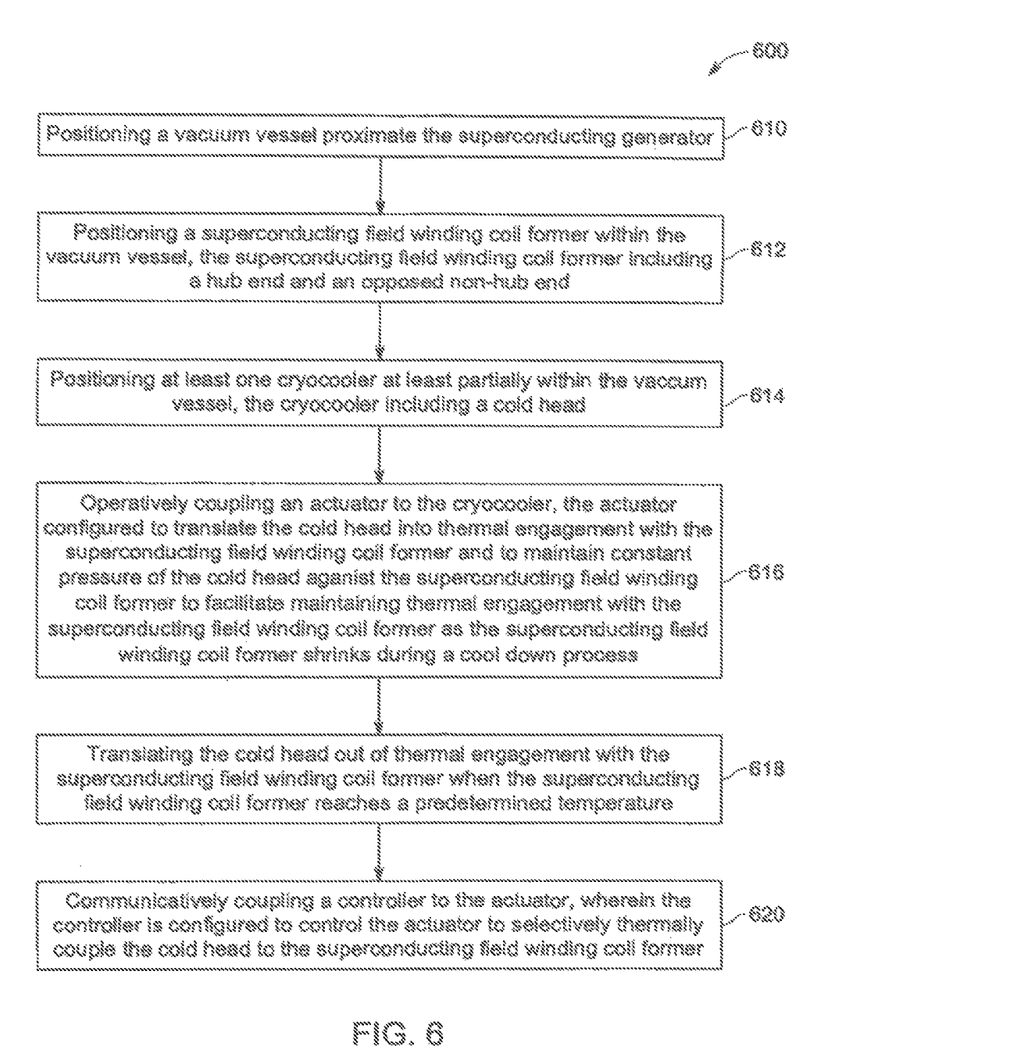
FIG. 6 illustrates an exemplary flowchart illustrating a method of assembling a cooling assembly for a superconducting generator.

FIG. 6 illustrates an exemplary flowchart illustrating a method 600 of assembling a cooling assembly, for example cooling assembly 86 (shown in FIG. 4) for a superconducting generator, such as superconducting generator 22 (shown in FIG. 2). Method 600 includes positioning 610 a vacuum vessel, such as vacuum vessel 72 (shown in FIG. 2), proximate the superconducting generator. Method 600 further includes positioning 612 a superconducting field winding coil former, for example superconducting field winding coil former 108 (shown in FIG. 4), within the vacuum vessel. In the exemplary embodiment, the superconducting field winding coil former includes a hub end and an opposing non-hub end, for example hub end 112 and non-hub end 114 (shown in FIG. 4).

At least one cryocooler, such as cryocooler 106 (shown in FIG. 4), is positioned 614 at least partially within the vacuum vessel. The cryocooler includes a coldhead, for example coldhead 122 (shown in FIG. 4). Method 600 includes operatively coupling 616 an actuator, such as actuator 130 (shown in FIG. 4) to the cryocooler. In the exemplary embodiment, the actuator is configured to translate the coldhead into thermal engagement with the superconducting field winding coil former and to maintain constant pressure of the coldhead against the superconducting field winding coil former to facilitate maintaining thermal engagement with the superconducting field winding coil former as the superconducting field winding coil former shrinks during a cool down process.

Method 600 further includes translating 618 the coldhead out of thermal engagement with the superconducting field winding coil former when the superconducting field winding coil former reaches a predetermined temperature. Moreover, method 600 includes communicatively coupling 620 a controller, for example controller 134 (shown in FIG. 4), to the actuator, wherein the controller is configured to control the actuator to selectively thermally couple the coldhead to the superconducting field winding coil former.

As described herein, an exemplary cryocooler assembly for performing a cool down operation of a coil former is provided. An actuator of the cryocooler assembly selectively thermally couples a cryocooler coldhead to the coil former when cooling is required, and decouples the coldhead once desired cooling is achieved, which prevents the need for additional liquid cryogen cooling systems and expensive/hazardous liquid cryogen. Further, a controller is configured to control operation of the actuator and translation of the cryocooler, which minimizes and/or eliminates the need for on-site personnel to operate the cryocooler. Moreover, the controller may be remotely operated and/or automatically controlled, requiring little or no supervision of the cooling assemblies of the superconducting generator.

Exemplary embodiments of an electrical machine and methods for cooling the electrical machine are described above in detail. The size ranges disclosed herein include all the sub-ranges there between. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cryocooler assembly for cooling a heat load generated by a superconducting field winding coil former of a field winding assembly, said cryocooler assembly comprising:
   a vacuum vessel surrounding the field winding assembly, the field winding assembly comprising a hub end and a non-hub end;
   a cryocooler at least partially inserted into said vacuum vessel, said cryocooler comprising a coldhead and an extended contact surface in thermal contact with the non-hub end of the field winding assembly; and
   an actuator coupled to said cryocooler and a controller operatively coupled to said actuator, said actuator configured to translate said cryocooler coldhead into thermal engagement with the extended contact surface and said controller is configured to control said actuator to thermally couple said coldhead to the extended contact surface to maintain constant pressure of said coldhead against the extended contact surface to facilitate maintaining thermal engagement with the field winding coil former as the extended contact surface and/or the field winding coil former shrinks during a cool down process, wherein the actuator is configured to maintain constant pressure between the cryocooler coldhead and the extended contact surface between approximately 100 Newtons and approximately 1000 Newtons, the cryocooler coldhead is configured to perform a cool down operation of the field winding coil former from about 300 K to about 20 K and the vacuum vessel includes insulated conduits configured to deliver cryogenic liquid to the vacuum vessel to cool the heat load from about 20 K to about 4 K, and the controller is configured to actuate the actuator to thermally decouple the coldhead from the field winding coil former when the field winding coil former reaches about 20 K.

2. The assembly of claim 1, further comprising a guide rod coupled to said cryocooler, wherein said actuator is configured to translate said guide rod to translate said coldhead into thermal engagement with the field winding coil former.

3. The assembly of claim 1, wherein said actuator is configured to translate said coldhead out of thermal engagement with the field winding coil former when the field winding coil former reaches a predetermined temperature.

4. The assembly of claim 1, wherein said cryocooler includes at least one of a pulse tube type, a GM type, and a Stirling type cooler.

5. The assembly of claim 1, wherein said actuator includes at least one of a hydraulic actuator, a pneumatic actuator, an electric actuator, a piezoelectric actuator, a moving iron controllable actuator, and a vacuum.

6. The assembly of claim 1, wherein said actuator is actuated by the controller which is configured to receive a signal sent remotely.

7. The assembly of claim 1, wherein the cryocooler further comprises a two stage cryocooler configured to condense vapor of the cryogenic liquid from the vacuum vessel.

8. A cryocooler assembly, comprising:
   a field winding assembly including a superconducting field winding coil former, the field winding assembly comprising a hub end and a non-hub end;
   a vacuum vessel surrounding the field winding assembly;
   a cryocooler assembly at least partially inserted into the vacuum vessel, the cryocooler assembly comprising a coldhead and an extended contact surface in thermal contact with the non-hub end of the field winding assembly, wherein the coldhead and the extended contact surface are movable relative to each other and, when in contact, cool the field winding coil former to a first temperature, the cryocooler assembly further comprising a two-stage cryocooler and a plurality of insulated conduits configured to deliver cryogenic liquid to the vacuum vessel to cool the field winding assembly from the first temperature to a second temperature; and
   an actuator coupled to said cryocooler assembly configured to translate the coldhead into engagement with the extended contact surface; and
   a controller operatively coupled to said actuator and configured to a) control the actuator to move the coldhead into contact with the extended contact surface and maintain constant pressure of the coldhead against the extended contact surface to facilitate maintaining thermal engagement with the field winding coil former as the extended contact surface and/or the field winding coil former shrinks during cooling to the first temperature and b) actuate the actuator to move the coldhead out of contact with the extended contact surface and thermally decouple the coldhead from the field winding coil former when the field winding coil former reaches the first temperature.

9. The assembly of claim 8, wherein the first temperature is about 20 K.

10. The assembly of claim 8, wherein the second temperature is about 4 K.

11. The assembly of claim 8, wherein the constant pressure between the cryocooler coldhead and the extended contact surface is between approximately 100 Newtons and approximately 1000 Newtons.

* * * * *